(12) United States Patent
Chiang et al.

(10) Patent No.: US 9,378,069 B2
(45) Date of Patent: Jun. 28, 2016

(54) LOCK SPIN WAIT OPERATION FOR MULTI-THREADED APPLICATIONS IN A MULTI-CORE COMPUTING ENVIRONMENT

(71) Applicant: International Business Machines Corporation, Armonk, NY (US)

(72) Inventors: Men-Chow Chiang, Austin, TX (US); Ken V. Vu, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 189 days.

(21) Appl. No.: 14/197,581

(22) Filed: Mar. 5, 2014

(65) Prior Publication Data

US 2015/0254113 A1   Sep. 10, 2015

(51) Int. Cl.
*G06F 9/46* (2006.01)
*G06F 9/52* (2006.01)

(52) U.S. Cl.
CPC .................................. *G06F 9/526* (2013.01)

(58) Field of Classification Search
CPC .............................. G06F 9/526; G06F 11/0724
USPC .............................................. 718/1, 100–108
See application file for complete search history.

(56) References Cited

U.S. PATENT DOCUMENTS

| | | | | |
|---|---|---|---|---|
| 6,658,447 B2* | 12/2003 | Cota-Robles | ......... | G06F 9/4843 712/215 |
| 6,748,593 B1* | 6/2004 | Brenner | ............... | G06F 9/5083 709/223 |
| 6,779,182 B1* | 8/2004 | Zolnowsky | ........... | G06F 9/4843 709/203 |
| 6,792,601 B1* | 9/2004 | Dimpsey | ............... | G06F 9/443 710/200 |
| 7,234,143 B2 | 6/2007 | Venkatasubramanian | | |
| 7,296,271 B1* | 11/2007 | Chalmer | ............... | G06F 9/4425 712/202 |
| 7,386,848 B2* | 6/2008 | Cavage | ................ | G06F 9/3851 718/100 |
| 7,584,473 B2* | 9/2009 | Forin | ..................... | G06F 9/4411 717/147 |
| 7,594,234 B1* | 9/2009 | Dice | ...................... | G06F 9/526 718/100 |
| 7,644,409 B2* | 1/2010 | Dice | ...................... | G06F 9/52 711/100 |

(Continued)

FOREIGN PATENT DOCUMENTS

JP    2010128895    6/2010

OTHER PUBLICATIONS

Scott et al, "Scalable Queue-Based Spin Locks with Timeout", ACM, pp. 44-52, 2001.*

(Continued)

*Primary Examiner* — Anil Khatri
(74) *Attorney, Agent, or Firm* — Terrile, Cannatti, Chambers & Holland, LLP; Stephen A. Terrile

(57) ABSTRACT

A method, system and computer-usable medium are disclosed for a lock-spin-wait operation for managing multi-threaded applications in a multi-core computing environment. A target processor core, referred to as a "spin-wait core" (SWC), is assigned (or reserved) for primarily running spin-waiting threads. Threads operating in the multi-core computing environment that are identified as spin-waiting are then moved to a run queue associated with the SWC to acquire a lock. The spin-waiting threads are then allocated a lock response time that is less than the default lock response time of the operating system (OS) associated with the SWC. If a spin-waiting fails to acquire a lock within the allocated lock response time, the SWC is relinquished, ceding its availability for other spin-waiting threads in the run queue to acquire a lock. Once a spin-waiting thread acquires a lock, it is migrated to its original, or an available, processor core.

20 Claims, 4 Drawing Sheets

(56) References Cited

U.S. PATENT DOCUMENTS

| | | | |
|---|---|---|---|
| 7,836,450 B2* | 11/2010 | Kissell | G06F 9/3851 710/260 |
| 7,853,951 B2 | 12/2010 | Rosenbluth et al. | |
| 7,870,553 B2* | 1/2011 | Kissell | G06F 9/3851 718/102 |
| 7,979,617 B2 | 7/2011 | McKenney et al. | |
| 8,904,067 B2* | 12/2014 | Saputra | G06F 9/544 710/52 |
| 9,032,404 B2* | 5/2015 | Kissell | G06F 8/4442 718/100 |
| 2007/0204271 A1 | 8/2007 | Gaiarsa et al. | |
| 2011/0289511 A1 | 11/2011 | van der Veen | |
| 2012/0017217 A1 | 1/2012 | Umezawa et al. | |
| 2012/0278809 A1 | 11/2012 | Brenner et al. | |
| 2013/0081038 A1 | 3/2013 | Dowf et al. | |

OTHER PUBLICATIONS

Rhee et al, "An Efficient Recovery-Based Spin Lock Protocol for Preemptive Shared-Memory Multiprocessors", ACM, pp. 77-86, 1996.*

Ros et al, "Callback: Efficient Synchronization without Invalidation with a Directory Just for Spin-Waiting", ACM pp. 427-438, 2015.*

Scott, "Non-Blocking Timeout in Scalable Queue-Based Spin Locks", ACM, pp. 31-40, 2002.*

Lynch et al, "Hardware Supported Time Synchronization in multi-Core Architectures", IEEE, pp. 88-94, 2009.*

Yu et al, "Adaptive Multi-Threading for Dynamic Workloads in Embedded Multiprocessors" ACM, pp. 67-72, 2010.*

Saravanan et al, "Performance Analysis of Multi-threaded Multi-core CPUs" ACM, pp. 49-53, 2013.*

Zabel et al, "Application Requirements and Efficiency of Embedded Java Bytecode Multi-Cores", ACM, pp. 46-52, 2010.*

Antonino Tumeo, Christian Pilato, Gianluca Palermo, Fabrizio Ferrandi, and Donatella Sciuto, "HW/SW methodologies for synchronization in FPGA multiprocessors," In Proceedings of the ACM/SIGDA international symposium on Field programmable gate arrays (FPGA '09). ACM, New York, NY, USA, 265-268. 2009.

Jaaskelainen, P.; Salminen, E.; Esko, O.; Takala, J., "Customizable Datapath Integrated Lock Unit," System on Chip (SoC), 2011 International Symposium on , vol., No., pp. 29,33, Oct. 31, 2011-Nov. 2, 2011.

Monchiero, M.; Palermo, G.; Silvano, C.; Villa, O., "Efficient Synchronization for Embedded On-Chip Multiprocessors," Very Large Scale Integration (VLSI) Systems, IEEE Transactions on , vol. 14, No. 10, pp. 1049,1062, Oct. 2006.

Yan Cui, Yingxin Wang, Yu Chen, Yuanchun Shi, "Lock-contention-aware scheduler: A scalable and energy-efficient method for addressing scalability collapse on multicore systems," ACM Transactions on Architecture and Code Optimization (TACO)—Special Issue on High-Performance Embedded Architectures and Compilers, vol. 9 Issue 4, Jan. 2013, Article No. 44, ACM New York, NY, USA.

* cited by examiner

LOCK SPIN WAIT OPERATION FOR MULTI-THREADED APPLICATIONS IN A MULTI-CORE COMPUTING ENVIRONMENT

BACKGROUND OF THE INVENTION

1. Field of the Invention

The present invention relates in general to the field of computers and similar technologies, and in particular to software utilized in this field. Still more particularly, it relates to a method, system and computer-usable medium for a lock-spin-wait operation for managing multi-threaded applications in a multi-core computing environment.

2. Description of the Related Art

Computing environments which include a multi-core processor system are becoming increasingly common and so have multi-threaded applications which exploit this hardware opportunity. An important performance consideration with a multi-threaded application is the salability of the application. Salability of the application relates to achieving a performance gain which linearly approximates the number of cores and number of threads used in the parallel execution of the application. To improve the salability of the application it is desirable to provide the processor system with an efficient locking mechanism. Often the locking mechanism is provided by a system library, usually supported by hardware in the form of atomic update primitives. A spin-wait mechanism, such as where software threads spin-wait to acquire a lock before entering a critical section for exclusive access to shared data, is a common option for implementing this important function due of its simplicity and the relatively short response time of lock acquisition.

However, spin-wait mechanisms may present certain challenges. For example, processor cycles may be wasted by threads spin-waiting for their turns to acquire the lock. Certain techniques have been developed to address some of the issues associated with spin-wait mechanisms. For example, some spin-wait mechanisms provide a non-blocking lock access option. With this type of mechanism, an application can be re-structured such that, a thread checks the status of its associated lock first upon arriving at a predetermined section, which may be critical to the operation. The thread acquires the lock and enters the predetermined section if the lock is available. If the lock is not available (i.e., the lock is already taken by some other thread), the thread retreats to do other productive work and then checks back later. However, one potential issue with this method is that the opportunity for such re-structuring is usually very limited. For example, the predetermined section may be the only place to get the next work item. Furthermore, commonly-accepted software design practice may be contrary to this approach as software is usually structured in such a way that threads are respectively assigned individual, specialized tasks. As a result, one thread dedicated to one task is not allowed to switch to a different task. Such software design methodology has the virtue of simplicity and thus more reliable, easier to maintain, expandable and most of the time has higher performance.

As another example, threads waiting for a lock may be suspended, thus preventing them from running on a processor. A thread can also choose to relinquish the processor that it is running on after spinning for a short period of time without acquiring the lock. The operating system (OS) then puts these threads in a block queue. Threads in a block queue are not scheduled to run on a processor. Instead, they are waiting to be unblocked by a certain hardware event, which in this case would be a lock release. In turn, the OS monitors lock release events and wakes up (i.e., makes a thread runnable) the thread associated with the lock being released in the block queue. The advantage of this approach is that a thread waiting for a lock will not consume any processor cycles. Therefore, the saved cycles can be used by other threads.

Unfortunately, suspending and subsequently unlocking a thread are Operating System (OS) kernel functions. The overhead of these functions, plus the context switching, imposes a high cost in getting a lock. In the worst case, which is not uncommon, a high percentage of processor cycles are consumed by OS activity in managing these block-waiting threads. A more serious drawback of this block-waiting strategy is that the lock latency becomes significantly higher when passing a lock to a suspended thread. In other words, the lock throughput is low. Accordingly, it would be desirable to preserve the high performance lock response time of a spin-wait mechanism while providing an efficient mechanism to minimize processor cycles lost due to spinning within the spin-wait mechanism.

SUMMARY OF THE INVENTION

A method, system and computer-usable medium are disclosed for a lock-spin-wait operation for managing multi-threaded applications in a multi-core computing environment. In various embodiments, a target processor core, referred to as a "spin-wait core" (SWC), is assigned (or potentially reserved) for primarily running spin-waiting threads in a multi-core computing environment. In these embodiments, wasted processor cycles typically associated with spin-wait operations is limited to a single processor core, thereby imposing a ceiling on the total amount of processor cycles that are wasted.

In various embodiments, threads operating in the multi-core computing environment are monitored to identify those threads that are spin-waiting. Those threads that are identified as spin-waiting are then moved to the SWC to acquire a lock. In certain embodiments, the spin-waiting threads are moved to a run queue associated with the SWC. In various embodiments, a processor core time management system is implemented to preserve the low lock response time benefit of spin-wait that is typically realized by not suspending spin-waiting threads. In these embodiments, the lock response time allocated to the spinning thread by the SWC is less than the default lock response time of the operating system (OS) associated with the SWC.

In various embodiments, an OS call is issued by a spin-waiting thread to indicate a failed lock attempt. In these embodiments, the SWC is relinquished after the failed lock attempt, ceding its availability for other spin-waiting threads in the run queue to acquire a lock. In various embodiments, the spin-waiting thread is migrated to its original, or an available, processor core subsequent to its acquiring a lock from the SWC.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
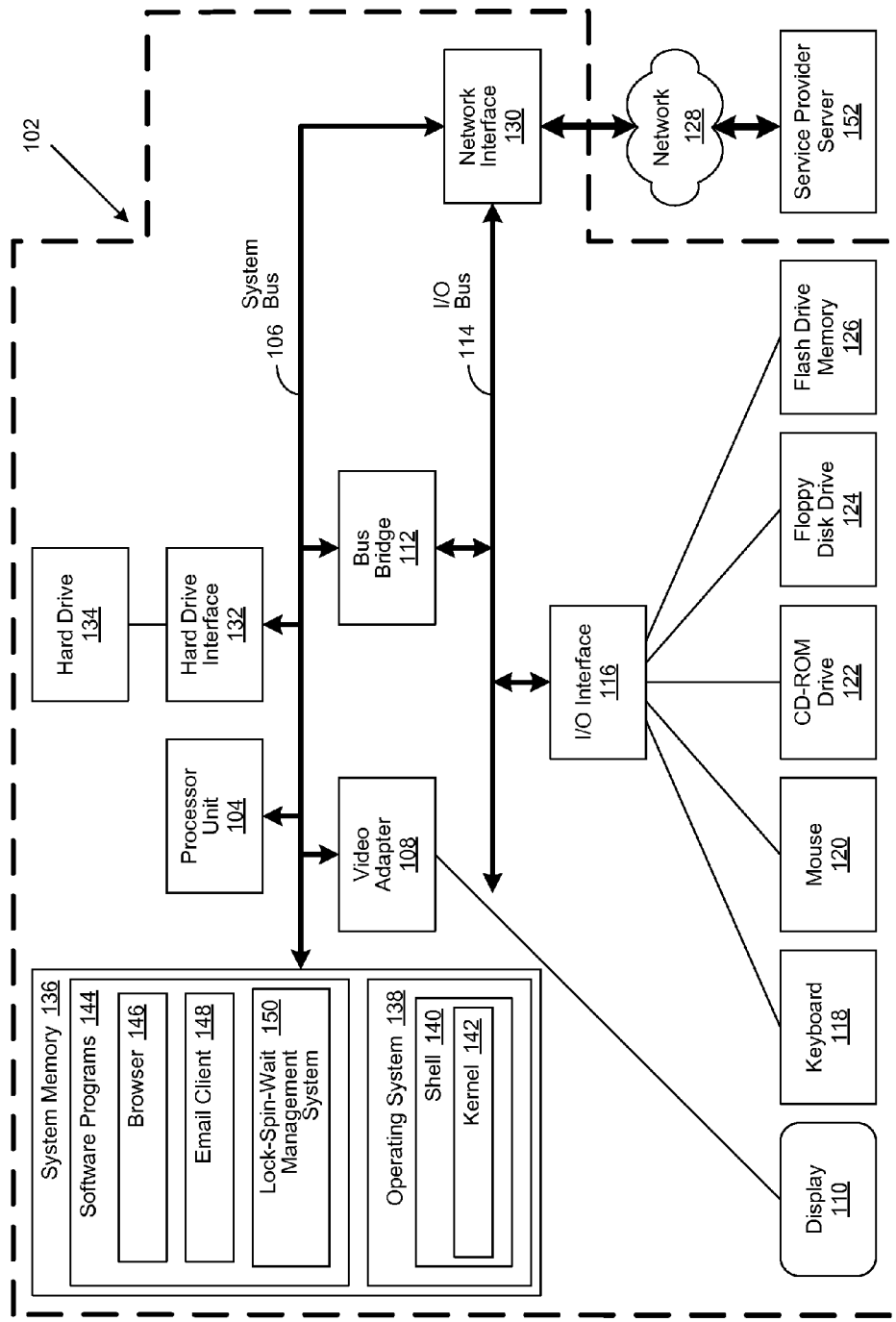
FIG. 1 depicts an exemplary client computer in which the present invention may be implemented.

A method, system and computer-usable medium are disclosed for a lock-spin-wait operation for managing multi-threaded applications in a multi-core computing environment. As will be appreciated by one skilled in the art, the present invention may be embodied as a method, system, or computer program product. Accordingly, embodiments of the invention may be implemented entirely in hardware, entirely in software (including firmware, resident software, micro-code, etc.) Or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EEPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as JAVA®, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VAN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gesture, etc.

As depicted, OS 138 also includes kernel 142, which includes lower levels of functionality for OS 138, including essential services required by other parts of OS 138 and software programs 144, including memory management, process and task management, disk management, and mouse and keyboard management. Software programs 144 may include a browser 146 and email client 148. Browser 146 includes program modules and instructions enabling a World Wide Web (WOW) client (i.e., client computer 102) to send and receive network messages to the Internet using Hypertext Transfer Protocol (HTTP) messaging, thus enabling communication with service provider server 152. In various embodiments, software programs 144 may also include a Lock-Spin-Wait Management System 150. In these and other embodiments, the Lock-Spin-Wait Management System 150 includes code for implementing the processes described hereinbelow. In one embodiment, client computer 102 is able to download the Lock-Spin-Wait Management System 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Beryllium cartridges, and the like. These and other variations are intended to be within the spirit, scope and intent of the present invention.

Figure 2:
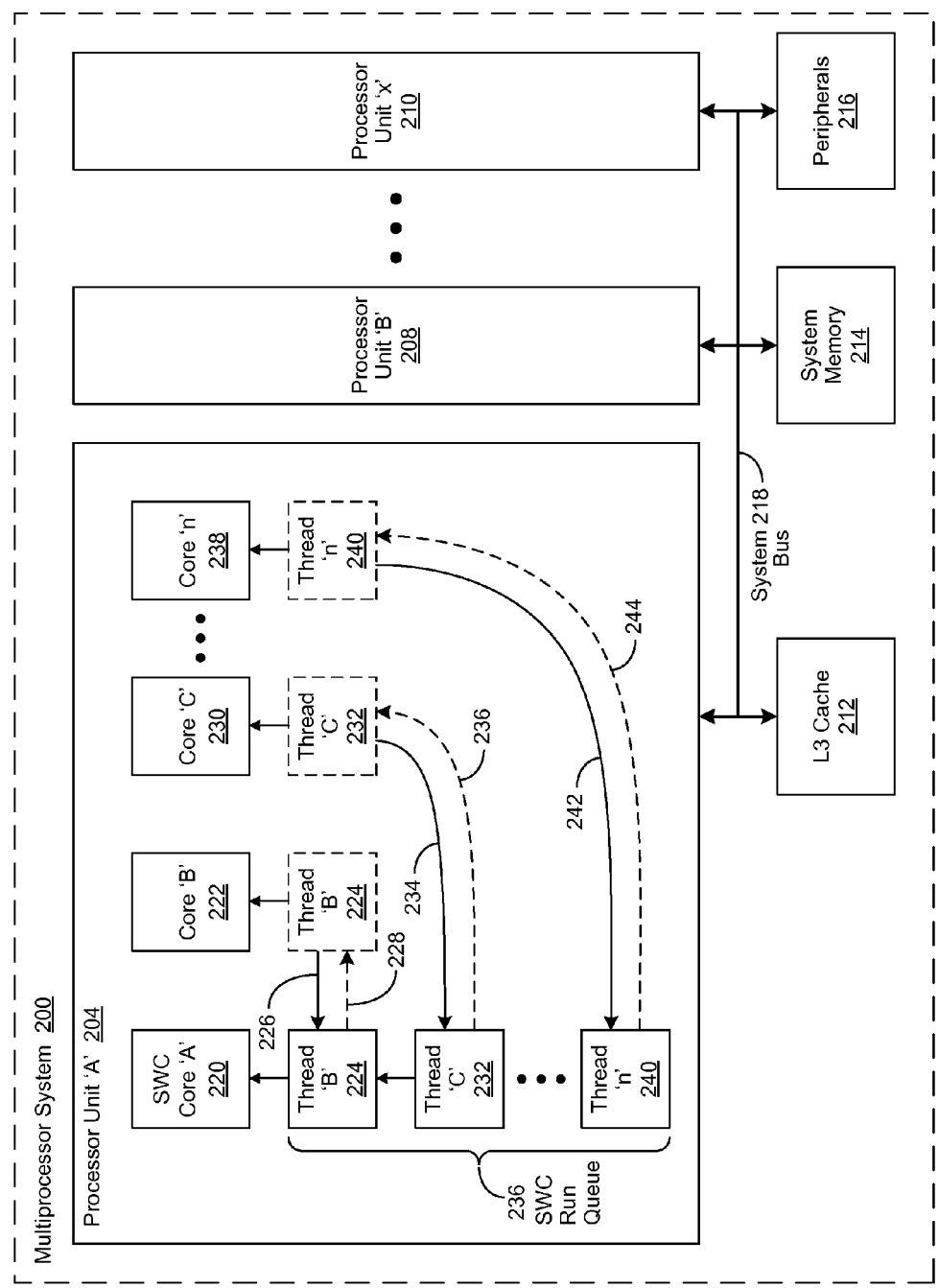
FIG. 2 is a simplified block diagram of a lock-spin-wait operation for managing multi-threaded applications in a multi-core computing environment.

FIG. 2 is a simplified block diagram of a lock-spin-wait operation implemented in accordance with an embodiment of the invention for managing multi-threaded applications in a multi-core computing environment. In this embodiment, an exemplary multi processor computer system 200 includes processor units 'A' 204, and 'B' 208 through 'x' 210, that are coupled to a system bus 218. A Level 3 (L3) cache 212, system memory 214, and peripherals 216 are likewise coupled to system bus 218. In these and other embodiments, processor units 'A' 204, and 'B' 208 through 'x' 210, communicate with each other, the Level 3 (L3) cache 212, the system memory 214, and peripherals 216 via system bus 218.

The system memory 214, which includes random access memory (RAM), stores program instructions and operand data used by the processor units 'A' 204, and 'B' 208 through 'x' 210, in a volatile, or temporary, state. The peripherals 216 may be connected to the system bus 218 via a bus, such as a peripheral component interconnect (PHI) local bus, using a PHI host bridge. A PHI bridge provides a low latency path through which processor units 'A' 204, and 'B' through 'x' 210, may access PHI devices mapped anywhere within bus memory or input/output (I/O) address spaces. The PHI host bridge interconnecting the peripherals 216 also provides a high bandwidth path to allow the PHI devices to access the system memory 214. Such PHI devices may include a network adapter, a small computer system interface (SCC) adapter providing interconnection to a permanent storage device (e.g., a hard disk), and an expansion bus bridge such as an industry standard architecture (IS) expansion bus for connection to I/O devices including a keyboard, a graphics adapter connected to a display device, and a graphical pointing device (mouse) for use with the display device.

In the multi-processor system 200, the processor units 'A' 204, and 'B' 208 through 'x' 210, are generally identical. That is, they all use a common set or subset of instructions and protocols to operate, and generally have the same architecture. As shown with processor unit 'A' 204, each processor unit may include one or more processor cores 'A' 220, 'B' 222, and 'C' 230 through 'n' 238, which carry out program instructions in order to operate the computer. An exemplary processor unit includes the POWERS5™. Processor marketed by International Business Machines Corporation (IBM™), of Armor, N.Y., which includes a single integrated circuit super scalar microprocessor having various execution units, registers, buffers, memories, and other functional units, which are all formed by integrated circuitry. The processor cores 'A' 220, 'B' 222, and 'C' 230 through 'n' 238 may operate according to reduced instruction set computing (RISE) techniques, and may employ both pipe lining and out-of-order execution of instructions to further improve the performance of the super scalar architecture.

Each of the processor cores 'A' 118, 'B' 222, and 'C' 230 through 'n' 238 typically includes an on-board, Level 1 (L1) cache (not shown), which typically comprise separate instruction and data caches implemented using high speed memory devices. Caches are commonly used to temporarily store values that might be repeatedly accessed by a processor in order to speed up processing by avoiding the longer step of loading the values from the system memory 214. The processor cores 'A' 220, 'B' 222, and 'C' 230 through 'n' 238 may also include another cache such as a second level (L2) cache (not shown), which along with a memory controller 134, supports the L1 caches that are respectively part of processor cores 'A' 220, 'B' 222, and 'C' 230 through 'n' 238. Additional cache levels may also be provided, such as the L3 cache 212, which is accessible via the system bus 218. Each cache level, from highest (L1) to lowest (L3) can successively store more information, but at a longer access penalty. For example, the on-board L1 caches in the processor cores 'A' 220, 'B' 222, and 'C' 230 through 'n' 238 might have a storage capacity of 128 kilobytes of memory, the L2 cache might have a storage capacity of 4 megabytes, and the L3 cache 212 might have a storage capacity of 32 megabytes. To facilitate repair or replacement of defective processor unit components, each processing unit 'A' 204, and 'B' 208 through 'x' 210 may be constructed in the form of a replaceable circuit board, plug gable module, or similar field replaceable unit (FUR), which can be easily swapped, installed in, or swapped out of the multi processor system 102 in a modular fashion.

In various embodiments, a target processor core, such as processor core 'A' 220, is assigned (or in certain embodiments reserved) for primarily running spin-waiting threads in the multi processor system 200. This approach allows wasted processor cycles typically associated with spin-wait operations to a single processor core, thereby imposing a ceiling on the total amount of processor cycles that are wasted within the multi processor system 200. In these and other embodiments, a processor core time management system is also implemented to preserve the low lock response time benefit of spin-wait that is typically realized by not suspending spin-waiting threads. As used herein, a spin-wait state refers to a technique where a process repeatedly checks to see if a condition is true, such as whether a lock is available. As likewise used herein, a lock refers to a synchronization mechanism for enforcing limits on access to a resource in an environment where there are many threads of execution. As such, a lock is intended to enforce a mutual exclusion concurrency control policy.

Referring now to FIG. 2, lock-spin-wait management operations are initiated by first select a target processor core (e.g., core 'A' 220) of the multi processor system 200. The selected processor core 220, also referred to herein as the "spin-wait core" (SWC) 220, is then assigned to primarily run spinning threads. Then the number of attempts allowed for a thread to acquire a lock before it is determined to be spin-waiting is set. In one embodiment, the number of attempts is user-selectable. In another embodiment, the default number of attempts is set to one attempt.

Various threads, such as threads 'B' 224, and 'C' 232 through 'n' 240, respectively associated with 'B' 222, and 'C' 230 through 'n' 238 are then monitored to identify those threads that are spin-waiting. If none of the threads 'B' 224, and 'C' 232 through 'n' 240, are determined to be spin-waiting, then the SWC 220 is used to run other, non-spinning threads and the thread monitoring process is continued. Otherwise, the identified spin-waiting threads, such as threads 'B' 224, and 'C' 232 through 'n' 240, are respectively moved 226, 234, 242 moved to a run queue 236 associated with the SWC 220 to wait for an available lock. As used herein, a run queue 236 is a queue that is used for all threads waiting their turn to run on a target processor, such as the SWC 220.

Skilled practitioners of the art will recognize that the SWC 220 can thus potentially be time-shared by many spinning threads, such as spinning threads 'B' 224, and 'C' 232 through 'n' 240, from a few to perhaps hundreds, or even thousands, at the same time. As a result, this potentiality could create a lock response time problem. For example, in a Unix-based system such as AIX™, available from International Business Machines (IBM™) of Armor, N.Y., the default time slice allocated for each spinning thread is typically 10 ms. Accordingly, it will take at least a few milliseconds (e.g., ~10) to effect a lock transfer if a spinning thread running on the SWC at the time of lock release is waiting for a different lock. However, the wait for a lock transfer will be longer if multiple threads at the front of the SWC run queue are waiting locks other than one just released. As a result, the low response time advantage of the commonly-used spin-wait approaches can be lost.

In various embodiments, this potentially long lock-response time issue is addressed through the implementation of a predetermined operating environment for the SWC 220. In these embodiments, it is not necessary to wait for the entire duration of the default time slice (e.g., ~10 ms, etc.) Allocated for the spin-wait thread to determine whether or not a lock has become available. Accordingly, each spin-wait thread (e.g., thread 'B' 224, 'C' 232 through 'n' 240) in the run queue 236 can voluntarily release the SWC 220 for the next thread to run as soon as it determines the lock status, regardless of whether the lock status is held or free. In these embodiments, the spin-wait thread (e.g., thread 'B' 224, 'C' 232 through 'n' 240) will run for a short time (e.g., a few tens-of-nanoseconds) if the lock is still held, which is long enough to access the local cache copy of the lock variable. Likewise, if the lock is free, then the thread will acquire the lock, typically after a memory access to load the line with the lock into its local cache.

In these embodiments, it will typically take about a proportionate amount of time (e.g., ~100 nanoseconds) to effect the lock transfer. As a result, the processor tenure of a thread (e.g., thread 'B' 224, 'C' 232 through 'n' 240) is much shorter than the default time duration (e.g., ~10 ms) typically allocated for a time slice. In various embodiments, spinning threads (e.g., 'B' 224 and 'C' 232 through 'n' 240) are given higher priority to run on the SWC 220 than other threads that are not in spin-wait activity to further realize the benefit of shorter response times. In certain embodiments, a non-spin-waiting thread is only allowed a turn to a time slice on the SWC 220, which is the same default time duration as in any other processor core, when there is no spin-wait thread (e.g., thread 'B' 224, 'C' 232 through 'n' 240) in the SWC 220 run queue. Accordingly, the operating system (OS) should thus avoid scheduling and dispatching a non-spin-wait thread to the SWC 220 if it is currently running a spin-wait thread (e.g., thread 'B' 224, 'C' 232 through 'n' 240).

Accordingly, in various embodiments, a lock-response time duration to be allocated to each thread (e.g., thread 'B' 224, 'C' 232 through 'n' 240) in the SWC run queue 236 is set. In certain embodiments, the lock-response time duration is user-selectable and the next spin-waiting thread (e.g., thread 'B' 224, 'C' 232 through 'n' 240) in the SWC run queue 236 is selected. Thereafter, a determination is made whether a lock corresponding to the spin-waiting thread (e.g., thread 'B' 224, 'C' 232 through 'n' 240) is available. If not, then the SWC 220 is released for the next spin-waiting thread (e.g., thread 'B' 224, 'C' 232 through 'n' 240). Otherwise, the current spin-waiting thread (e.g., thread 'B' 224, 'C' 232 through 'n' 240) acquires the available lock, and the spin-waiting thread (thread 'B' 224, 'C' 232 through 'n' 240) is then respectively moved 228, 236, 244 to its original destination processor core 'B' 222, and 'C' 230 through 'n' 238, for execution.

From the foregoing, those of skill in the art will recognize that there is an upper bound to the number of processor cycles lost to spin-waiting threads (e.g., thread 'B' 224, 'C' 232 through 'n' 240) as spin-waiting can only occur to one processor, such as the SWC 220, instead of a potentially larger number of processors, which are only bounded by the number of active spin-wait threads. Furthermore, performance context is preserved, as the only data footprint (i.e., the data accessed by the thread, or the working set) a thread carries when it is migrated to the SWC 220 is the lock variable.

Since multiple spin-wait threads (e.g., thread 'B' 224, 'C' 232 through 'n' 240) for the same lock share the same copy, this movement of data (e.g., a cache line containing the lock) only occurs once, when the first spin-wait thread for the lock migrates to the SWC 220. As a result, such thread migration will often incur no memory activity. Once a spin-waiting thread (e.g., thread 'B' 224, 'C' 232 through 'n' 240) acquires a lock, it migrates 228, 236, 244 back to its original core (e.g., cores 'B' 224, and 'C' 230 through 'n' 238), where it can find its associated instruction and data context (e.g., the working set) in its local caches or local memory for execution. This context-preserving quality avoids the cache miss ratio increases typically associated with thread migration in general situations.

Moreover, lock response time is short. As used herein, lock response time refers to the time needed to acquire a free lock, or the time between a lock release and its next acquisition by a spin-waiting thread (e.g., thread 'B' 224, 'C' 232 through 'n' 240). For a spin-waiting thread, each tenure of execution at the SWC 220 typically takes a few tens to approximately one hundred nanoseconds as described herein, plus a thread switching time, in various embodiments. The longer tenure of one hundred nanoseconds is relatively much less frequent because it occurs only once for each lock release.

Skilled practitioners of the art will recognize that such short processor tenures can be achieved because thread switching will be initiated by the spinning thread (e.g., thread 'B' 224, 'C' 232 through 'n' 240), not by OS when the time slice is up. As such, a thread voluntarily exits from the current time slice by making a system or hypervisor call such as "cede_processor" as available from IBM™ AIX™ Unix OS. Since the lock access code, including the spin-wait portion, is usually provided as system library, this voluntary ceding of processor can easily be implemented and become a system wide locking protocol.

It will likewise be appreciated that a lower level of cache coherence traffic is generated during lock transfer. In the absence of the invention described in greater detail herein, such cache coherence traffic generated during a lock transfer can increase super-linearly to the number of shared cache copies of the lock variable in a system, such as the multi processor system 200. These shared copies are created by individual spinning threads (e.g., thread 'B' 224, 'C' 232 through 'n' 240) at their respective resident cores (e.g., cores 'B' 222, 'C' 230 through 'n' 238), and they proliferate with increasing lock contention. Such high cache coherence traffic is generated from the need to invalidate, often repeatedly, a large number of shared copies of the lock variable. This short but intense burst of memory accesses to the lock variable at high lock contention is the main cause of much lower than expected lock throughput currently observed in some processors. In various embodiments, the amount of cache coherence traffic is reduced as there are at most two cache copies for each lock in the system, one in the original processor core where a thread holds the lock and the other at the SWC 220 for all the spin-wait threads (e.g., thread 'B' 224, 'C' 232 through 'n' 240) of the lock. Said another way, lock contention becomes so minimized that typically only one thread is attempting to acquire a lock as it is released.

Likewise, those of skill in the art will recognize that the various embodiments of the invention will retain compatibility with existing applications that do not implement the invention in their operation. Furthermore, such applications will behave the same way as before, except that the OS will not dispatch the application's threads to the SWC 220. It will be appreciated that while these applications may still waste processor resources during their spin-wait operations, the system still preserves the benefit from those applications in various embodiments of the invention. Furthermore, applications implementing the various embodiments of the invention will coexist well with applications using conventional spin-wait locking protocols.

In various embodiments, a thread (e.g., thread 'B' 224, and 'C' 232 through 'n' 240) will make a system call such as "cede_processor" to relinquish its associated processor core (e.g., core 'B' 222, and 'C' 230 through 'n' 238) when it starts spin-waiting. In certain embodiments, the call registers the status of spin-wait through a thread-specific status bit in the hardware, to be checked by OS after the call. Once the OS detects that the thread is in spin-waiting mode, it migrates 226, 234, 242 the thread (e.g., thread 'B' 224, and 'C' 232 through 'n' 240) to the SWC 220.

Once a spin-waiting thread (e.g., thread 'B' 224, 'C' 232 through 'n' 240) acquires its time slice to run at the SWC 220, it runs for a short, predetermined time, as described in greater detail herein, if it does not acquire the lock. For example, the spin-waiting thread (e.g., thread 'B' 224, 'C' 232 through 'n' 240) may spend perhaps only a few tens of nanoseconds to make a single futile attempt to acquire the lock before relinquishing the SWC 220. If the spin-waiting thread (e.g., thread 'B' 224, 'C' 232 through 'n' 240) acquires the lock, it then immediately makes a "cede_processor" call to relinquish the SWC 220 voluntarily.

The spin-waiting thread (e.g., thread 'B' 224, 'C' 232 through 'n' 240) then communicates to the OS that it just acquired the lock using the same thread-specific status bit, signaling that its current spin-wait phase is finished. The OS then migrates 228, 236, 244 the thread to its original processor core (e.g., core 'B' 222, 'C' 230 through 'n' 238), or to a free processor core to continue its execution. In these embodiments, the OS keeps track of the "resident" processor (e.g., by using the processor ID) for each spin-wait thread, so that when the thread eventually acquires the lock, the OS knows which processor the thread originally came from.

In these various embodiments, the only modification to the spin wait instruction sequence is that, after each spin-wait iteration, and if failing to acquire the lock, the spin-waiting thread makes a "cede_processor" system call or the like, voluntarily giving up the SWC 220. If this is the first attempt for the spin-waiting thread (e.g., thread 'B' 224, 'C' 232 through 'n' 240) to get the lock (i.e., when the spin-waiting thread has just arrived at the locking code), the spin-waiting thread (e.g., thread 'B' 224, 'C' 232 through 'n' 240) also updates a thread-specific status bit to indicate that the thread is in spin-wait mode now. If the spin-waiting thread (e.g., thread 'B' 224, 'C' 232 through 'n' 240) instead acquires the lock, then it still makes a "cede_processor" system call, and changes the thread specific status bit to non-spin-wait value, indicating to the OS that its spin-wait phase just ends. In both cases, when the status bit is changed, the OS will migrate 228, 236, 244 the thread (e.g., thread 'B' 224, 'C' 232 through 'n' 240) to the proper processor core as described in greater detail herein.

Figure 3A:
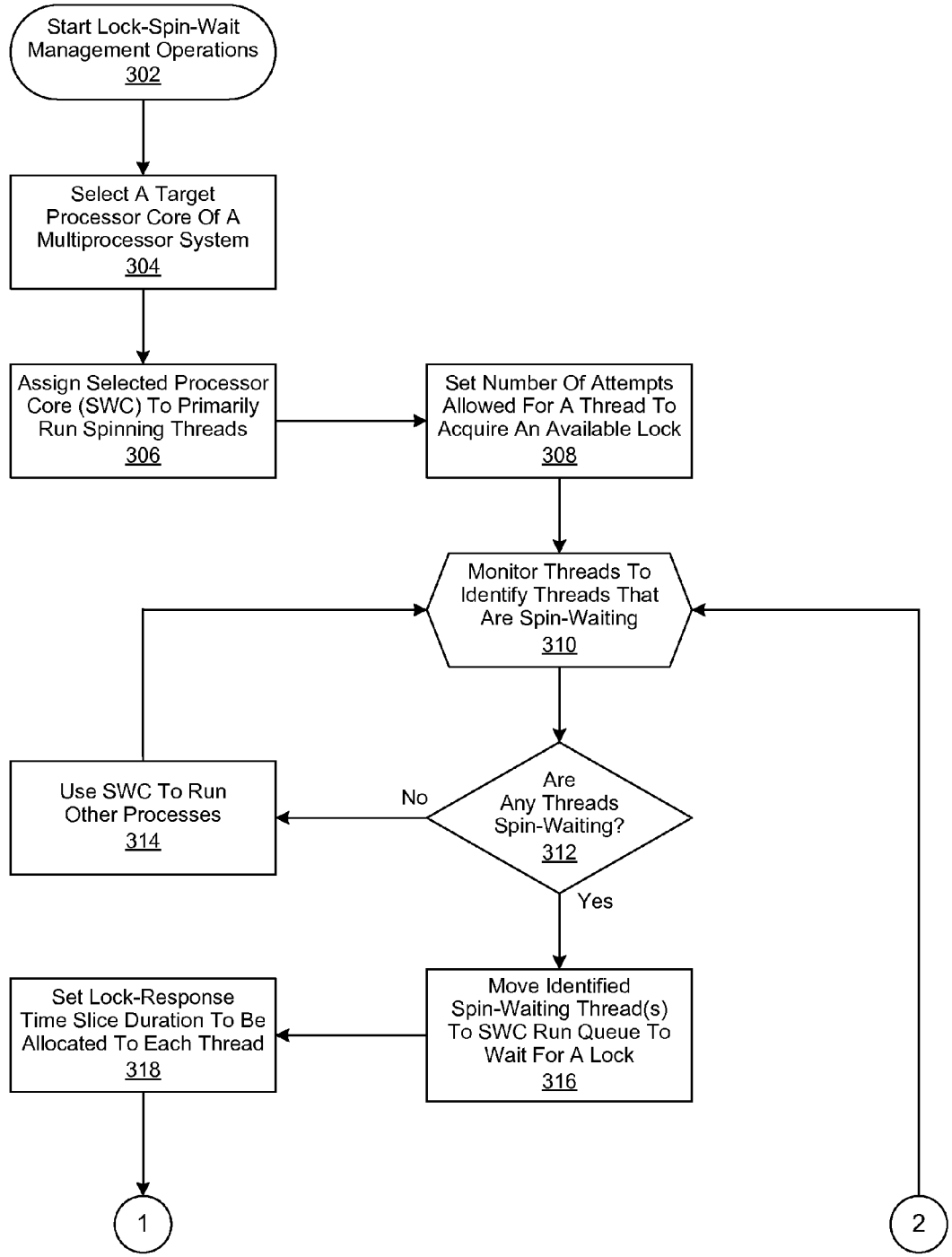
FIGS. 3A and 3B are a generalized flowchart of a lock-spin-wait management operation for managing multi-threaded applications in a multi-core computing environment.
Figure 3B:
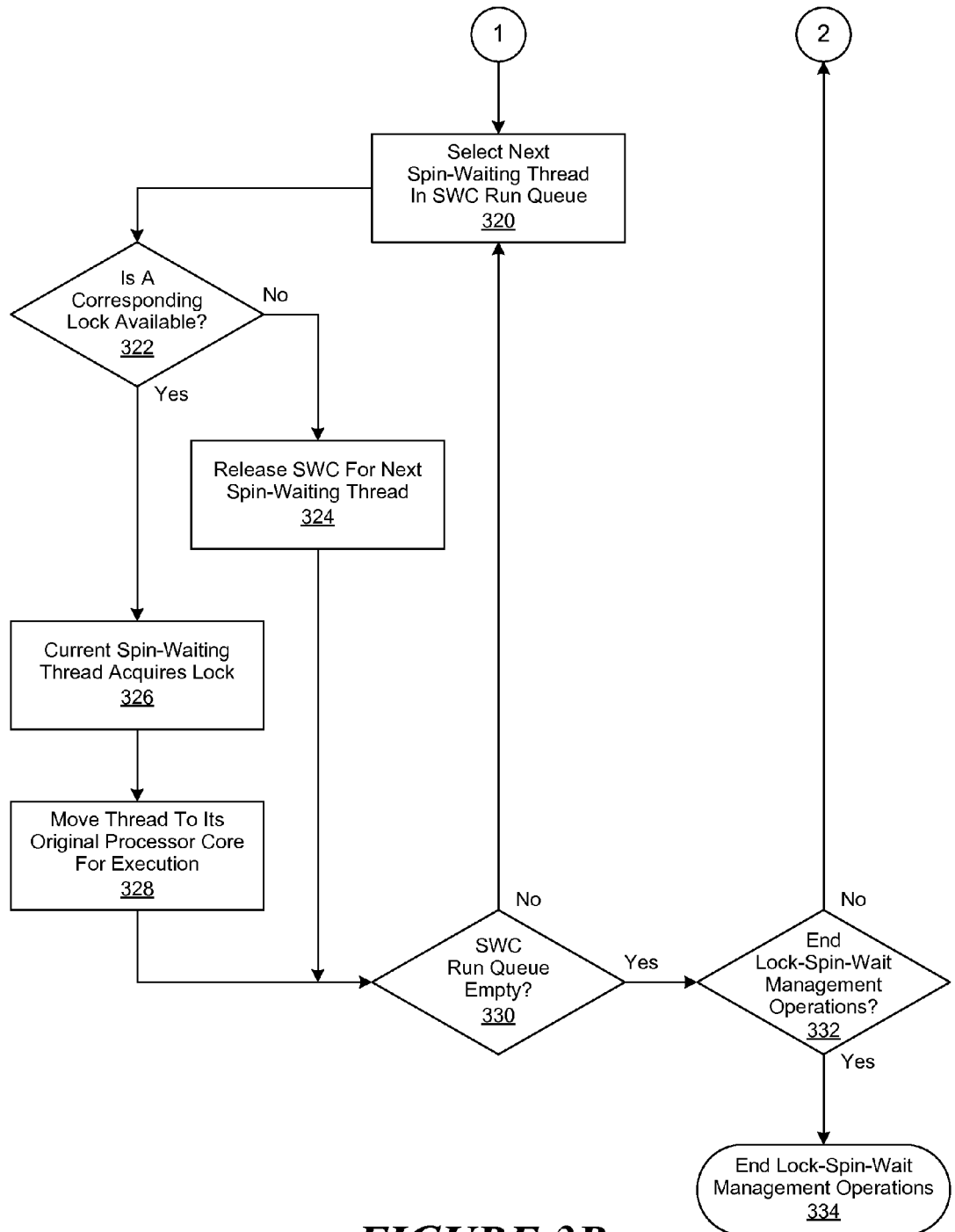

FIGS. 3A and 3B are a flowchart of a lock-spin-wait operation implemented in accordance with an embodiment of the invention for managing multi-threaded applications in a multi-core computing environment. In this lock-spin-wait management operations are begun in step 302, followed by the selection of a target processor core of a multi processor system in step 304. The selected processor core, also referred to herein as the "spin-wait core" (SWC), is then assigned to primarily run spinning threads in step 306. Then, in step 308, the number of attempts allowed for a thread to acquire a lock before it is determined to be spin-waiting is set. In one embodiment, the number of attempts is user-selectable. In another embodiment, the default number of attempts is set to one attempt.

Various threads are then monitored in step 308 to identify threads that are spin-waiting, followed by a determination being made in step 312 whether any of the monitored threads have been determined to be spin-waiting. If not, then the SWC is used to run other, non-spinning threads in step 314 and the process is continued, proceeding with step 310. Otherwise, the identified spin-waiting threads are moved to a run queue associated with the SWC in step 316 to wait for an available lock.

Accordingly, a lock-response time duration to be allocated to each thread in the SWC run queue is set in step 318. In various embodiments, the lock-response time duration is user-selectable. Then, in step 320, the next spin-waiting thread in the SWC run queue is selected, followed by a determination being made in step 322 whether a lock corresponding to the spin-waiting thread is available. If not, then the SWC is released in step 324 for the next spin-waiting thread. Otherwise, the current spin-waiting thread acquires the available lock in step 326, and the spin-waiting thread is then moved to its original destination processor core for execution in step 328.

Thereafter, or after the SWC is released in step 324, a determination is made in step 330 whether the SWC run queue is empty. If not, then the process is continued, proceeding with step 320. Otherwise, a determination is made in step 332 whether to end lock-spin-wait management operations. If not, then the process is continued, proceeding with step 310. Otherwise, lock-spin-wait management operations are ended in step 332.

Although the present invention has been described in detail, it should be understood that various changes, substitutions and alterations can be made hereto without departing from the spirit and scope of the invention as defined by the appended claims.

What is claimed is:

1. A computer-implemented method for managing multi-threaded applications in a multi-core computing system, comprising:
    monitoring a plurality of threads to determine whether any of the plurality of threads is a spin-waiting thread;
    assigning a first processor core to manage spin waits in a multi-core system;
    detecting a failure of a thread to acquire a lock on a second processor core,
    the failure to acquire a lock indicating that the thread is a first spin-waiting thread;
    transferring the first spin-waiting thread to the first processor core to acquire a lock; and
    allocating a lock response time for the first spin-waiting thread to acquire a lock from the first processor.

2. The method of claim 1, wherein the transferring comprises placing the first spin-waiting thread in a run queue associated with the first processor core, the run queue containing a second spin-waiting thread.

3. The method of claim 2, wherein the allocated lock-response time is less than the default lock response time of an operating system (OS) associated with the first processor core.

4. The method of claim 3, further comprising:
    issuing an OS call to set a lock state, the OS call issued by the first spin-waiting thread and the lock state providing an indication of a lock acquisition failure by the first spin-waiting thread.

5. The method of claim 4, further comprising
    relinquishing the first processor core to allow the second spin-waiting thread in the run queue to acquire a lock, the relinquishing of the first processor core performed after the OS call has been issued.

6. The method of claim 1, further comprising:
    migrating the first spin-waiting thread to the second processor core subsequent to the first spin-waiting thread acquiring a lock from the first processor core.

7. A system comprising:
    a processor;
    a data bus coupled to the processor; and
    a computer-usable medium embodying computer program code, the computer-usable medium being coupled to the data bus, the computer program code used for managing multi-threaded applications in a multi-core computing system and comprising instructions executable by the processor and configured for:
    monitoring a plurality of threads to determine whether any of the plurality of threads is a spin-waiting thread;
    assigning a first processor core to manage spin waits in a multi-core system;
    detecting a failure of a thread to acquire a lock on a second processor core,
    the failure to acquire a lock indicating that the thread is a first spin-waiting thread; transferring the first spin-waiting thread to the first processor core to acquire a lock; and
    allocating a lock response time for the first spin-waiting thread to acquire a lock from the first processor.

8. The system of claim 7, wherein the transferring comprises placing the first spin-waiting thread in a run queue associated with the first processor core, the run queue containing a second spin-waiting thread.

9. The system of claim 8, wherein the allocated lock-response time is less than the default lock response time of an operating system (OS) associated with the first processor core.

10. The system of claim 9, further comprising:
    issuing an OS call to set a lock state, the OS call issued by the first spin-waiting thread and the lock state providing an indication of a lock acquisition failure by the first spin-waiting thread.

11. The system of claim 10, further comprising:
    relinquishing the first processor core to allow the second spin-waiting thread in the run queue to acquire a lock, the relinquishing of the first processor core performed after the OS call has been issued.

12. The system of claim 7, further comprising:
    migrating the first spin-waiting thread to the second processor core subsequent to the first spin-waiting thread acquiring a lock from the first processor core.

13. A non-transitory, computer-readable storage medium embodying computer program code, the computer program code comprising computer executable instructions configured for:
    monitoring a plurality of threads to determine whether any of the plurality of threads is a spin-waiting thread;
    assigning a first processor core to manage spin waits in a multi-core system;
    detecting a failure of a thread to acquire a lock on a second processor core,
    the failure to acquire a lock indicating that the thread is a first spin-waiting thread;
    transferring the first spin-waiting thread to the first processor core to acquire a lock; and
    allocating a lock response time for the first spin-waiting thread to acquire a lock from the first processor.

14. The non-transitory, computer-readable storage medium of claim 13, wherein the transferring comprises placing the first spin-waiting thread in a run queue associated with the first processor core, the run queue containing a second spin-waiting thread.

15. The non-transitory, computer-readable storage medium of claim 14, wherein the allocated lock-response time is less than the default lock response time of an operating system (OS) associated with the first processor core.

16. The non-transitory, computer-readable storage medium of claim 15, further comprising:
    issuing an OS call to set a lock state, the OS call issued by the first spin-waiting thread and the lock state providing an indication of a lock acquisition failure by the first spin-waiting thread.

17. The non-transitory, computer-readable storage medium of claim 16, further comprising:
    relinquishing the first processor core to allow the second spin-waiting thread in the run queue to acquire a lock, the relinquishing of the first processor core performed after the OS call has been issued.

18. The non-transitory, computer-readable storage medium of claim 13, further comprising:
    migrating the first spin-waiting thread to the second processor core subsequent to the first spin-waiting thread acquiring a lock from the first processor core.

19. The non-transitory, computer-readable storage medium of claim 13, wherein the computer executable instructions are deployable to a client system from a server system at a remote location.

20. The non-transitory, computer-readable storage medium of claim 13, wherein the computer executable instructions are provided by a service provider to a user on an on-demand basis.

* * * * *